Figure 1:
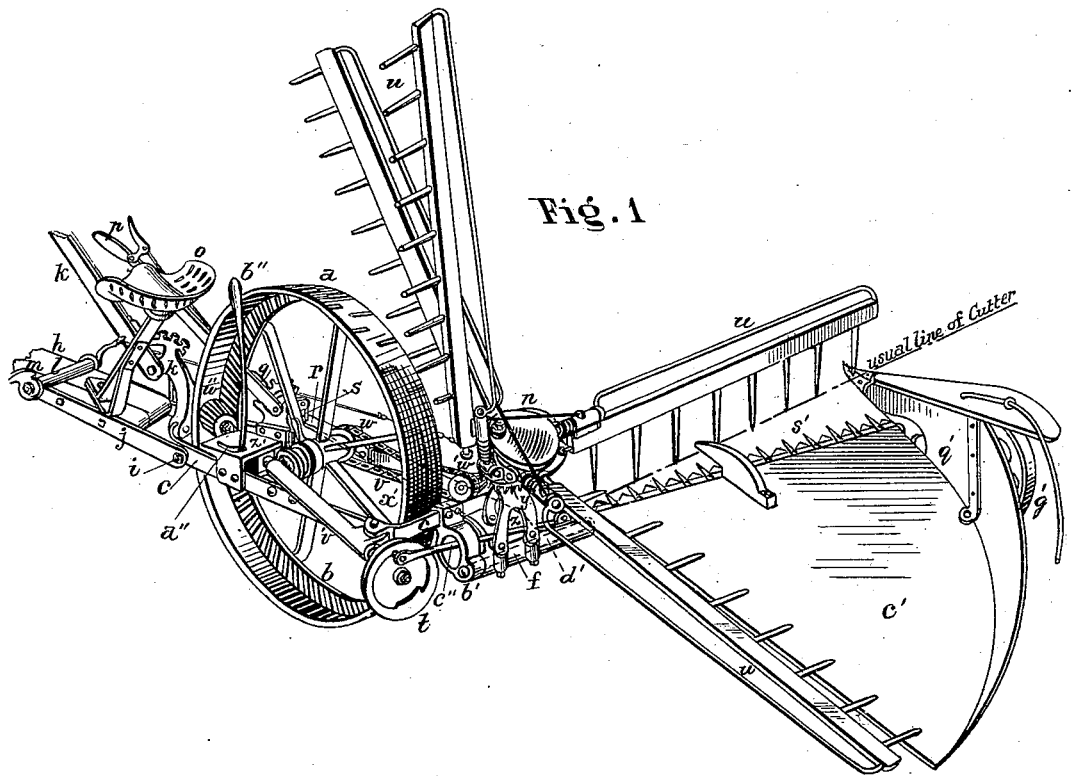

(No Model.) 2 Sheets—Sheet 1.

W. N. WHITELEY.
HARVESTER.

No. 297,545. Patented Apr. 22, 1884.

Attest
J. C. Turner
Aug. Jordan

Inventor
W. N. Whiteley
By his Atty R. O. Smith (No Model.) 2 Sheets—Sheet 2.
W. N. WHITELEY.
HARVESTER.
No. 297,545. Patented Apr. 22, 1884.
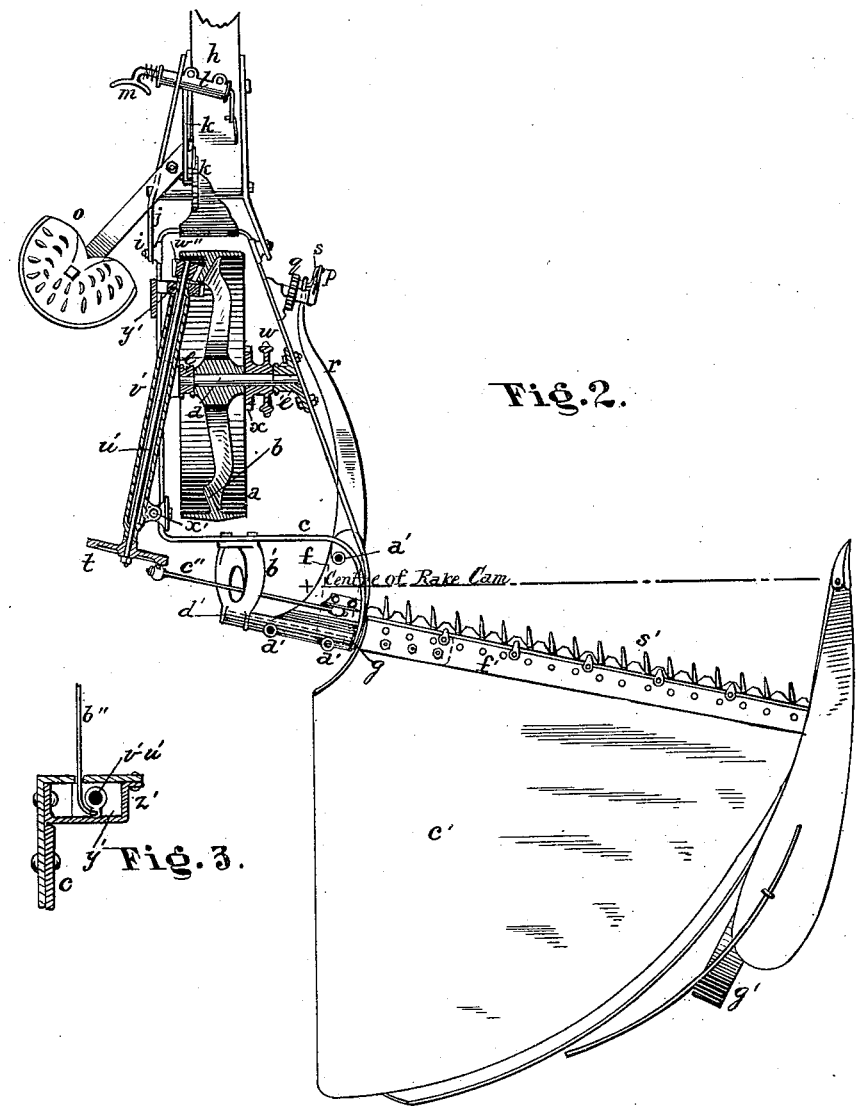
Attest
J. C. Turner
Aug. Jordan
Inventor
Wm N Whiteley
By his atty
R. D. O. Smith

UNITED STATES PATENT OFFICE.

WILLIAM N. WHITELEY, OF SPRINGFIELD, OHIO, ASSIGNOR TO WHITELEY, FASSLER & KELLY, OF SAME PLACE.

HARVESTER.

SPECIFICATION forming part of Letters Patent No. 297,545, dated April 22, 1884.

Application filed May 4, 1882. Renewed March 15, 1884. (No model.)

*To all whom it may concern:*

Be it known that I, WILLIAM N. WHITELEY, of Springfield, county of Clark, State of Ohio, have invented a new and useful Improvement in Harvesters, of which the following is a specification.

In the accompanying drawings, Figure 1 is a perspective view of a harvesting-machine embodying my invention. Fig. 2 is a plan view of a machine embodying my invention, illustrated with the rakes and actuating-gear removed to avoid confusion; and Fig. 3 is a sectional view of the movable support that sustains the crank-shaft and shifting-lever.

My invention relates, first, to a novel arrangement of means for obtaining a direct connection to the knife-pitman by one pair of bevel-gears, also effecting the desired obliquity of the cutting apparatus relatively to the line of draft of the machine; second, to a novel arrangement of means for supporting the crank-shaft, and devices for throwing the pinion, to which it is attached, into and out of mesh with the main gear-wheel; third, in a novel arrangement of means for adjustably supporting the cutting apparatus and platform, and the coupling device intermediate between said cutting apparatus and the main frame for giving increased strength thereto and facilitating the control of the cutting apparatus by the operator. The means of attaining these results will be understood from the following description with reference to the drawings, in which—

$a$ is the master-wheel, having bevel-gear $b$.

$c$ is a wrought-iron frame, bent to any desired form consistent with strength and the location of parts it connects, attached to the main axle $d$ by means of journal-boxes $e$ $e'$ and to the shoe $f$ by a joint, $g$.

$h$ is the customary draft-pole, pivoted to the main frame $c$ at $i$ by means of straps $j$. The draft-pole is provided with the usual tilting device $k$, by means of which its angle may be changed relatively to the main frame $c$.

$l$ is the customary pivoted shaft, by means of which the operator may, by the use of his foot on the foot-piece $m$, throw a gate on the cam-head $n$ to change the reels to rakes or rakes to reels, only as he may see fit.

$o$ is the attendant's seat, located convenient to the levers $k$ $p$.

$q$ $p$ is the usual tilting-lever and toothed sector, which is rigidly attached to the main frame $c$, as shown. It connects to one end of a drag-bar, $r$, by means of an intermediate link, $s$, that connects said drag-bar with an arm upon the rock-shaft of lever $p$.

The combined rakes and reels $u$ are preferably of that kind known to users as "rolling rakes," and may be of any suitable construction. These combined rakes and reels are actuated by a chain-belt, $v$, that connects the two sprocket-wheels $w$ $w'$, the one, $w$, of which is fast to the ratchet-wheel $x$, that connects with the master-wheel by means of a pawl, (not shown,) and the other to a bevel-wheel that actuates the bevel-gear upon the rake-head $y$. The rake-head $y$ and cam $n$ are supported upon stand $z$, that attaches to the shoe $f$ by bolts or rivets through perforations $a'$. $b'$ is an apertured suspension-piece firmly secured to and depending from the rear of the main frame $c$ for the purpose of supporting the near end of the quadrant-platform $c'$ through the agency of the shoe $f$, which is pivoted thereto, as well as to the end of the frame $c$ by the shaft or bolt $d'$. (Shown in dotted lines.) The shoe $f$ is secured by bolts or rivets to the finger-bar $f'$. $g'$ is the grain-wheel, supported on a double-jointed arm pivoted to the grain-board by means of a bracket.

$s'$ is the cutting apparatus. It may be of any suitable construction, arranged obliquely to the line of travel of the machine, in order to attain a direct connection by bevel-gear from the crank-wheel $t$ to the main gear-wheel $b$, the angle at which it is placed permitting the shaft $u'$ and pipe-box $v'$ to pass the end of the axle $d$ centrally at any angle for a suitable location of the crank-wheel $t$ and bevel-pinion $w''$, thus obviating the use of additional or more complicated gear for this purpose, and at the same time permitting the rakes $u$ to be placed farther front of the cutting apparatus, thus insuring a better presentation of grain to the knife and of cut grain to the rakes. The pipe-box $v'$, that carries the crank-shaft $u'$, is pivoted to the main frame $c$ at $x'$ and passes through a sliding block, $y'$, at the pinion end of said shaft. The block $y'$ is constructed to slide in a track, $z'$, secured to the main frame $c$, the top of said track being provided with a cam-slot, $a''$, through which a lever, $b''$, that is pivoted to the pipe-box $v'$, passes for the purpose of throwing the pinion $w''$ into or out of mesh with wheel $b$. The crank-wheel $t$ and knife $s'$ are connected by a pitman, $c''$, provided with a universal joint at each end.

Having thus described my invention, what I claim as new, and desire to secure by Letters Patent, is—

1. In a harvesting-machine, a cutting apparatus, arranged obliquely to the line of travel of the machine and actuated by one pair of bevel-gears, combined with a pivoted shaft and bearing $u'$ $v'$, box $y'$, track $z'$, having a cam-slot, $a''$, and a pivoted lever, $b''$, for the purpose specified.

2. In a harvesting-machine, a frame, $c$, bent and pivoted to the shoe $f$ at $g$, in combination with an apertured suspension-piece, $b'$, connecting the parts $c$ and $f$, so as to form a pivot upon which the platform may be tilted.

3. In a harvesting-machine, a frame, $c$, bent and pivoted to the shoe $f$ at $g$, and an apertured suspension-piece, $b'$, connecting the parts $c f$, in combination with a drag-bar, $r$, substantially as described, and for the purpose of tilting the platform $c'$.

4. A main driving and supporting wheel provided with a bevel-gear ring located under its rim, with the teeth of the same facing outward, and a cutting apparatus set oblique to the line of advance, combined with an actuating crank-shaft at right angles with the cutting apparatus and in the plane of the main-wheel axis, and the pinion on its forward end in engagement with said gear-wheel, whereby said crank-shaft may pass the center of the wheel and its pinion engage with a gear-wheel sheltered beneath the rim of the main wheel.

In testimony whereof I have hereunto set my hand this 17th day of April, 1882.

WILLIAM N. WHITELEY.

Witnesses:
HENRY MILLWARD,
E. O. BOWMAN.